(12) United States Patent
Dieringer et al.

(10) Patent No.: US 9,346,494 B2
(45) Date of Patent: May 24, 2016

(54) PIVOTING DOOR

(71) Applicant: Crown Equipment Corporation, New Bremen, OH (US)

(72) Inventors: Mark S. Dieringer, Saint Marys, OH (US); Douglas M. Bornhorst, New Bremen, OH (US); Kevin A. Gilliland, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/445,421

(22) Filed: Jul. 29, 2014

(65) Prior Publication Data

US 2016/0031489 A1 Feb. 4, 2016

(51) Int. Cl.
*B60R 16/04* (2006.01)
*B62D 25/24* (2006.01)
*B60L 11/18* (2006.01)

(52) U.S. Cl.
CPC ............ *B62D 25/24* (2013.01); *B60L 11/1877* (2013.01)

(58) Field of Classification Search
CPC ................................ B60R 16/04; Y02E 60/12
USPC ........................................................ 180/68.5
See application file for complete search history.

(56) References Cited

U.S. PATENT DOCUMENTS

| | | | | |
|---|---|---|---|---|
| 6,637,807 B2* | 10/2003 | Gotz | ................ | B60K 1/04 180/65.1 |
| 7,070,225 B2* | 7/2006 | Herrmann | ............. | B60J 5/0487 292/341.15 |
| 7,249,645 B2* | 7/2007 | Herrmann | ............. | B60J 5/0487 180/68.5 |
| 7,309,087 B2* | 12/2007 | Lane | ..................... | E05B 85/10 292/216 |
| 7,455,137 B2* | 11/2008 | Magsaam | ............. | B60J 5/0487 180/68.5 |
| 7,591,334 B2* | 9/2009 | Eckersley | ............. | B62D 25/10 180/2.1 |
| 7,712,563 B2* | 5/2010 | Niebuhr | ..................... | 180/68.5 |
| 8,500,094 B2* | 8/2013 | Haslberger | .............. | B06K 1/04 180/68.5 |
| 2008/0179118 A1 | 7/2008 | Herrmann | | |

FOREIGN PATENT DOCUMENTS

| | | |
|---|---|---|
| DE | 2243046 A1 | 3/1974 |
| DE | 2719876 A1 | 11/1978 |
| DE | 10218189 A1 | 11/2003 |
| EP | 1205424 A1 | 5/2002 |

OTHER PUBLICATIONS

Ross, Kenneth; International Search Report and Written Opinion of The International Searching Authority; International Application No. PCT/US2015/035281 (CRN 709 PB); Jan. 7, 2016; European Patent Office; Rijswijk, Netherlands.

* cited by examiner

*Primary Examiner* — John Walters
*Assistant Examiner* — James Triggs
(74) *Attorney, Agent, or Firm* — Stevens & Showalter LLP

(57) ABSTRACT

An industrial truck includes wall structure defining a compartment and a pivoting door spanning an opening in the wall structure when in a closed position. The truck also includes pivoting structure coupling the pivoting door to the wall structure allowing the pivoting door to pivot relative to the wall structure, and a latching structure. In particular, the latching structure includes a latching bolt coupled to the wall structure; a latching arm having a first end and a second end, wherein the arm is pivotably mounted at the first end to an element of the pivoting door; and a latch torsion spring associated with the element and engaging the latching arm to bias the latching arm towards the latching bolt when the pivoting door moves in a direction from the closed position towards an open position.

20 Claims, 9 Drawing Sheets

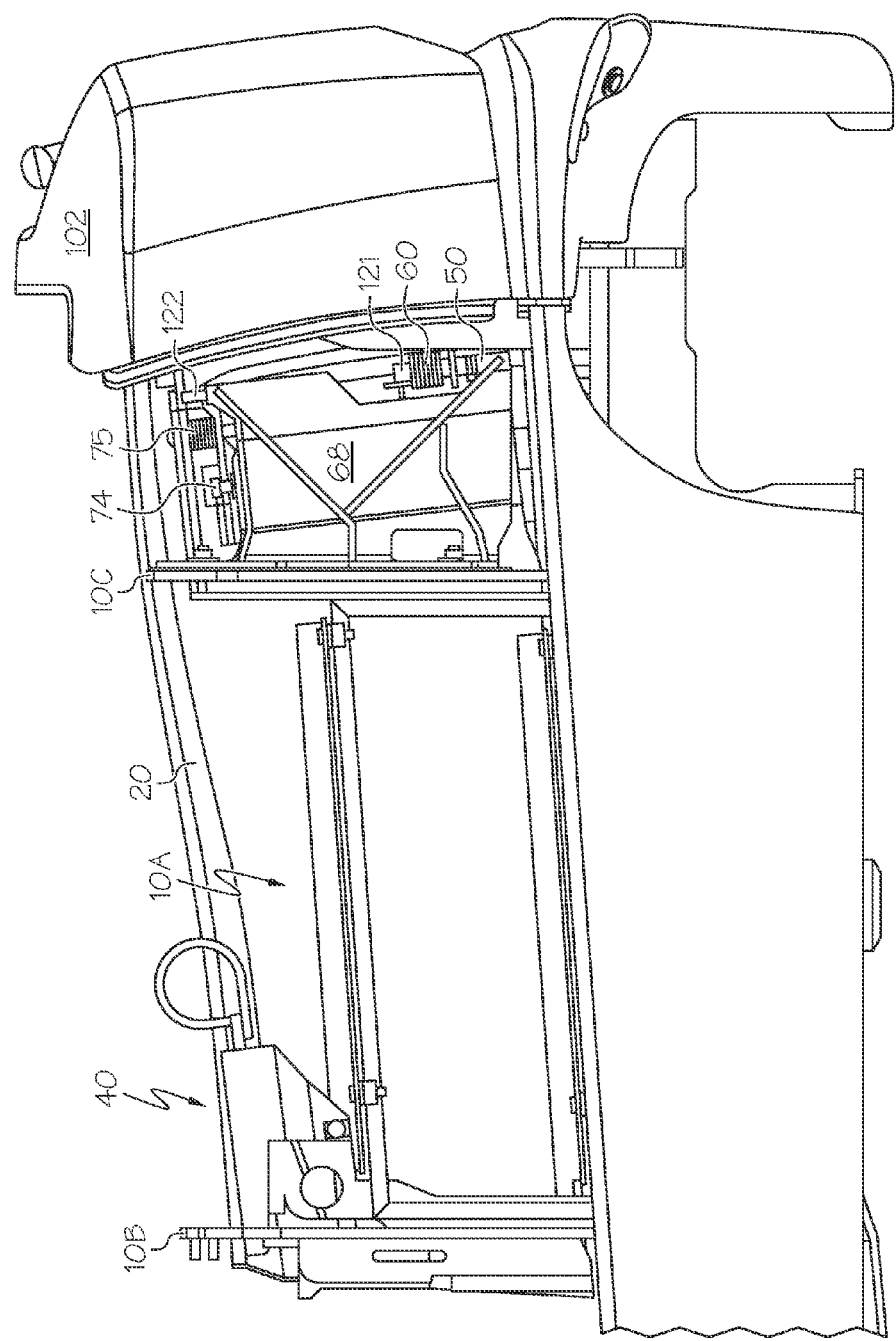

PIVOTING DOOR

FIELD OF THE INVENTION

The present invention relates to industrial trucks and, more particularly, to a frame of an industrial truck.

BACKGROUND OF THE INVENTION

Typically, an industrial truck includes a vehicle frame that provides structural support for the components of the truck as well as accommodates functional aspects of the truck. In particular, a battery-powered industrial truck, such as for example, a counterweight fork-lift truck, can have a frame design that includes a battery compartment for securing the battery during operation of the truck. To simplify access to such a compartment, the vehicle frame can include a door that opens and closes to provide access to an inside of the compartment. Some compartments can be designed such that the access door can open laterally with respect to the vehicle frame. However, such a door should not interfere with other operations of the truck nor be difficult to use.

SUMMARY OF THE INVENTION

One aspect of embodiments of the present invention relates to an industrial truck that includes wall structure defining a compartment and a pivoting door spanning an opening in the wall structure when in a closed position. The truck also includes pivoting structure coupling the pivoting door to the wall structure allowing the pivoting door to pivot relative to the wall structure, and a latching structure. In particular, the latching structure includes: a latching bolt coupled to the wall structure; a latching arm having a first end and a second end, wherein the arm is pivotably mounted at the first end to an element of the pivoting door; and a latch torsion spring associated with the element and engaging the latching arm to bias the latching arm towards the latching bolt when the pivoting door moves in a direction from the closed position towards an open position.

The latch torsion spring is biased to move the second end of the latching arm away from the pivoting door when the pivoting door moves in the direction from the closed position towards the open position. According to a particular embodiment the second end of the latching arm comprises a latching hook and movement of the pivoting door, in the direction from the closed position towards the open position, is limited when the latching bolt is received by the latching hook.

In accordance with this aspect, the latching bolt and the latching hook cooperate, when the latching bolt is received by the latching hook, to maintain the pivoting door in a position defining a fully open position. Also, the latching structure further comprises a release extension coupled to the latching arm, wherein movement of the release extension towards the pivoting door, when the pivoting door is in the fully open position, results in the latching bolt being released from the latching hook. In particular, the latch torsion spring includes a first end engaging the pivoting door, and a second end engaging the latching arm.

Also, in accordance with this aspect, the pivoting door includes a main panel; a door bracket; and a pin coupled to the door bracket and defining the pivoting door element.

In accordance with this aspect of the invention, the wall structure includes a first wall; a second wall; and a wall bracket coupled to the second wall wherein the latching bolt is attached to the wall bracket. Also, the pivoting structure includes a door torsion spring having a first end and a second end, the first end engaging with the wall structure and the second end engaging with the pivoting door, the door torsion spring biased to oppose movement of the pivoting door transitioning from an open position to the closed position.

According to one embodiment the compartment contains a battery.

In accordance with another aspect of embodiments of the present invention, an industrial truck includes wall structure defining a compartment and a pivoting door spanning an opening in the wall structure when in a closed position. The industrial truck also includes a pivoting structure coupling the pivoting door to the wall structure allowing the pivoting door to pivot relative to the wall structure, wherein the pivoting structure includes a first pivoting structure torsion spring having a first end and a second end, the first end engaging with the wall structure and the second end engaging with the pivoting door, the first torsion spring biased to oppose movement of the pivoting door transitioning from an open position to the closed position.

In one embodiment the first torsion spring is biased to reinforce movement of the pivoting door transitioning from the closed position to the open position.

In accordance with this other aspect, the pivoting structure further includes an upper pin and a lower pin oriented mostly-vertically and coupled to the wall structure; and the pivoting door includes a main door panel; a door bracket; an upper tube forming part of the door bracket and fitted over the upper pin, and a lower tube forming part of the door bracket and fitted over the lower pin. In particular, the first torsion spring is positioned about an outside of the lower tube and the pivoting door also includes a horizontally-oriented pin coupled to an upper end of the lower tube, the second end of the torsion spring engages the horizontally-oriented pin.

In accordance with this other aspect of the present invention, the wall structure includes a first wall; a second wall; and a wall bracket coupled to the second wall, wherein the first end of the torsion spring engages a portion of the wall bracket. Also, the first torsion spring is vertically oriented around the lower tube with the first end positioned lower than the second end.

Also, the industrial truck includes a releasable locking mechanism locking the pivoting door to the wall structure when in the closed position.

BRIEF DESCRIPTION OF THE DRAWINGS

FIG. 9 depicts an inside view of the pivoting door of FIG. 7 in a fully-closed position in accordance with the principles of the present invention.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Embodiments of the present invention are directed to a pivoting door for a materials handling truck, or industrial truck, such as, for example, a turret, counter-balance or reach truck. The pivoting door may also be incorporated into agricultural or other work vehicles. A vehicle or truck in which the pivoting door is incorporated can be battery-operated and, therefore, include a battery. A compartment defined by a wall structure of a vehicle frame of the truck can be utilized to house the battery. The pivoting door described herein can, for example, be designed for the battery compartment such that opening the door allows an operator access to the compartment. When in a closed position, the door spans across an opening of the compartment defined by the wall structure.

The vehicle frame of the truck can include a number of features which the design of a pivoting door can accommodate. For example, opening and closing of the door should not cause the door to interfere with other portions of the vehicle frame. Also, in some instances, a door which remains open, once opened, can be beneficial to improve accessibility to the compartment.

Figure 1:
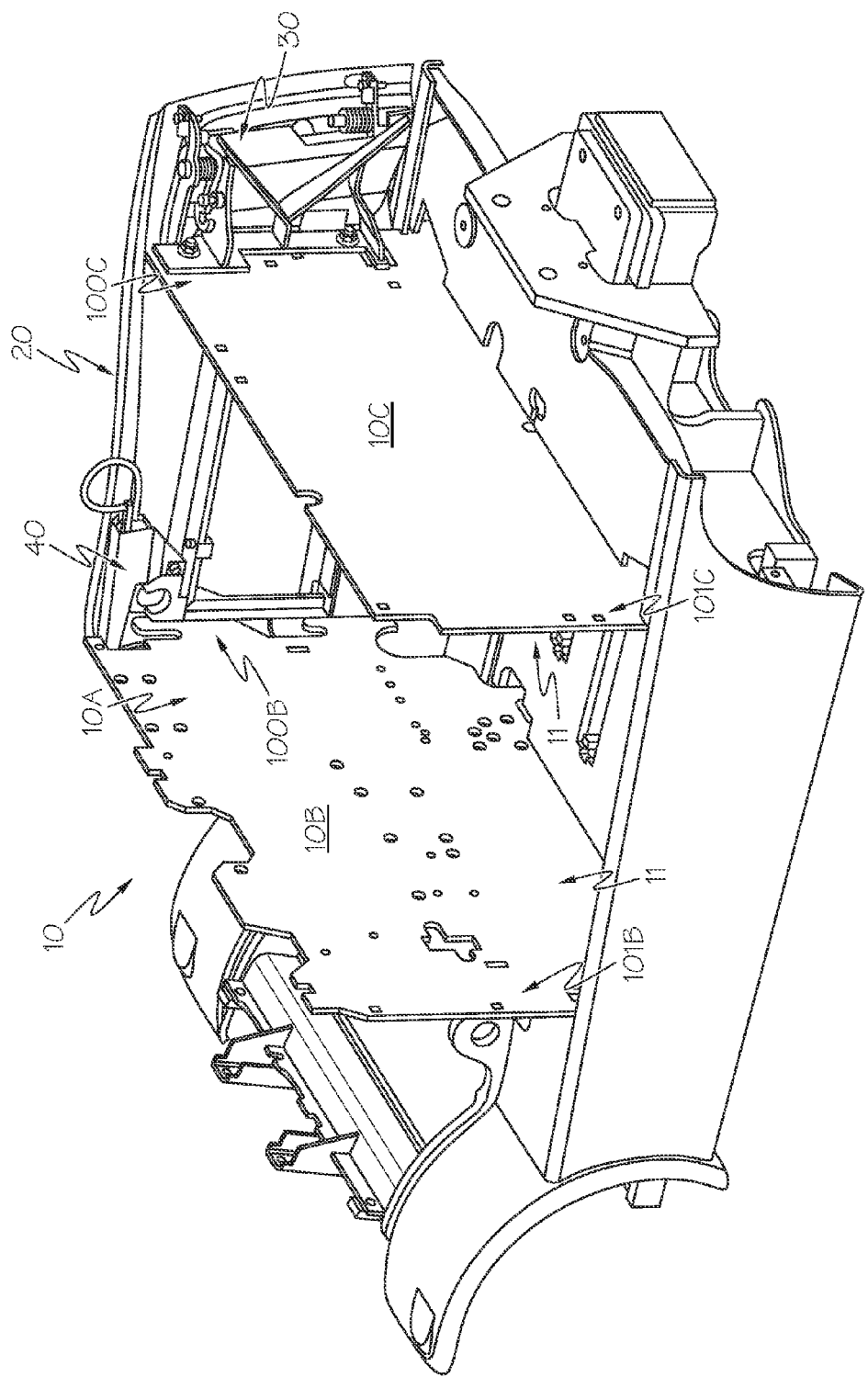
FIG. 1 depicts wall structure of an industrial truck defining a compartment in accordance with the principles of the present invention.

FIG. 1 depicts a vehicle frame 10 of an industrial truck including wall structure 11 defining a compartment 10A, such as a battery compartment, in accordance with the principles of the present invention. The wall structure 11 may comprise first and second fixed walls 10B and 10C, which, in the illustrated embodiment shown in FIG. 1, are generally parallel to one another. A door 20 spans across first ends 100B and 100C of the fixed walls 10B and 10C, so as to close off those fixed wall first ends 100B and 100C. While not illustrated in FIG. 1, a further wall may span between second ends 101B and 101C of the fixed walls 10B and 10C to further define the compartment 10A.

The door 20 can include a pivoting structure 30 associated with the second fixed wall 10C to allow the door to pivot relative to the second wall 10C. The door 20 can also include a releasable locking mechanism 40 that allows the door to lock when in a closed position. The door 20 can be opened to allow access to the compartment 10A. For example, the door 20 can be opened to allow access to a battery (not shown) stored in the compartment 10A.

Figure 2A:
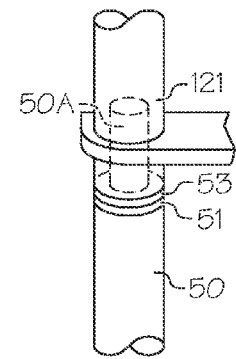
FIG. 2A is a view of a tube of the pivoting door fitted over a receiving portion of a pin on a fixed wall.
Figure 2:
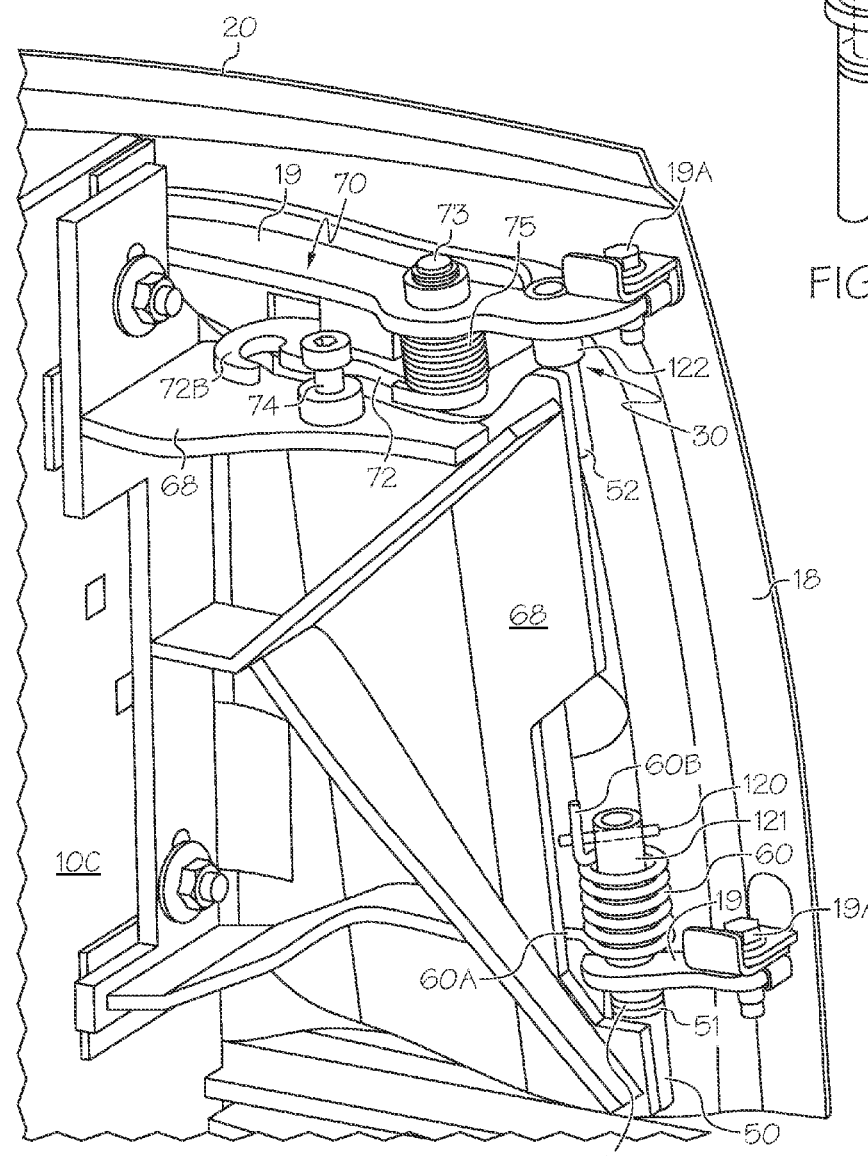
FIG. 2 depicts details about a pivoting structure and latching structure associated with a pivoting door in accordance with the principles of the present invention.

FIG. 2 depicts details about the pivoting structure 30 and a latching structure associated with the pivoting door 20 in accordance with the principles of the present invention. The door 20 pivots about lower and upper pins 50 and 52 that are part of the pivoting structure 30 associated with the second fixed wall 10C, as shown FIG. 2. More specifically, the lower and upper pins 50 and 52 are fixed to a wall bracket 68, discussed further below. First and second tubes 121 and 122, forming part of the door 20, are fitted over receiving portions 50A and 52A of the pins 50 and 52, respectively, see FIGS. 2A and 8. A spacer 51 and a washer 53 may be provided between each tube 121, 122 and each pin 50, 52, see FIG. 2A.

As shown, a first torsion spring 60 is positioned about the first tube 121 and has a first end 60A that engages the wall bracket 68, which bracket 68 forms part of the wall structure 11 and is fixed to the second fixed wall 10C. The first torsion spring 60 also includes a second end 60B that engages a pin 120. The pin 120 may be fixed to the tube 121 that forms part of the door 20.

Thus, the first torsion spring 60 may have a first end 60A that engages the wall structure 11 via the bracket 68 coupled to the second fixed wall 10C and may have a second end 60B that engages the pivoting door 20 via the pin 120 and the tube 121. The first torsion spring 60 can be biased so as to oppose or slow movement of the pivoting door 20 as it transitions from an open position to a closed position. As the door 20 moves from an open position to a closed position, the first torsion spring 60 functions to slow down movement of the door 20 just before the releasable locking mechanism 40 engages a bolt 47 or other structure on the first fixed wall 10B. The first torsion spring 60 can also be biased to reinforce movement of the pivoting door 20 as it transitions from the closed position to the open position; thus, the first torsion spring 60 also biases the door 20 outward after it is first opened.

Figure 3:
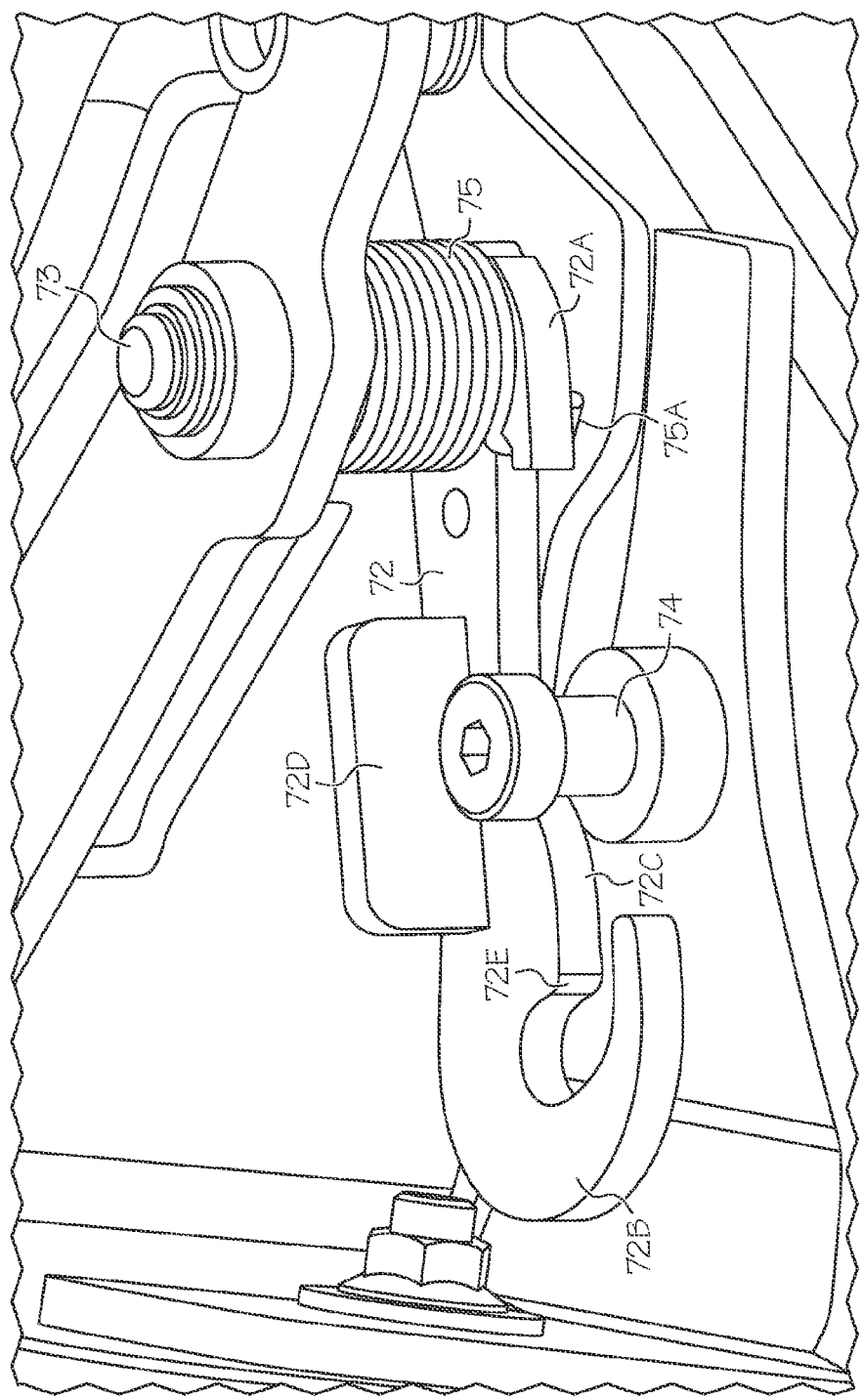
FIG. 3 depicts details about a latching arm associated with a pivoting door in accordance with the principles of the present invention.
Figure 4:
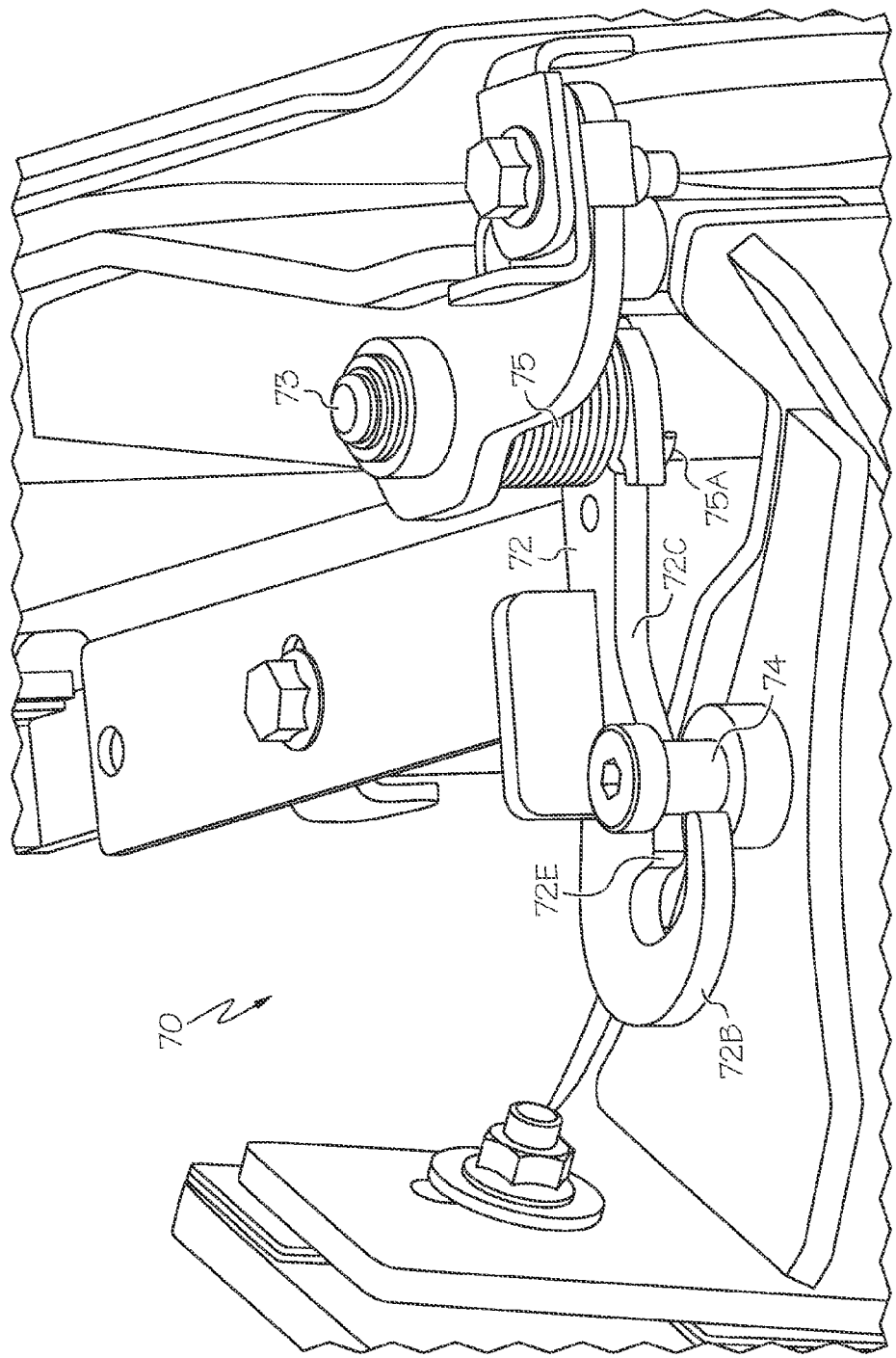
FIG. 4 and FIG. 5 depict the latching arm of FIG. 3 in different positions in accordance with the principles of the present invention.

FIG. 2 also depicts a latching mechanism 70 that can be associated with the fixed bracket 68 and the door 20 so as to limit outward movement of the door 20. The latching mechanism 70 may, for example, include a latching arm 72, see FIGS. 2-5. The latching arm 72 is pivotably mounted at a first end 72A by a pin 73 fixed to the door 20 such that the pin 73 moves with the door 20. A latching bolt 74 is fixedly mounted to the fixed bracket 68. Comparing FIG. 3 with FIG. 4 illustrates how, because the pin 73 is fixed to the door, a position of the pin 73 relative to the latching bolt 74 can vary as the door 20 is moved, i.e., pivoted open. Because latching arm 72 is mounted at its first end 72A to the pin 73, movement of the door 20 also causes movement of the latching arm 72.

As shown in the figures, a second end 72B of the latching arm 72 can define a latching hook and a second torsion spring 75, also referred to herein as a latch torsion spring, can be positioned about the pin 73. A first end (not shown) of the torsion spring 75 engages the door 20 while a second end 75A, see FIG. 3, engages the latching arm 72. The second torsion spring 75 functions to bias the latching arm 72 in a direction toward the latching bolt 74 and away from the door 20. Thus, the second torsion spring 75 can bias the latching arm 72 towards the latching bolt 74 when the pivoting door 20 moves in a direction from the closed position towards the open position.

Figure 5:
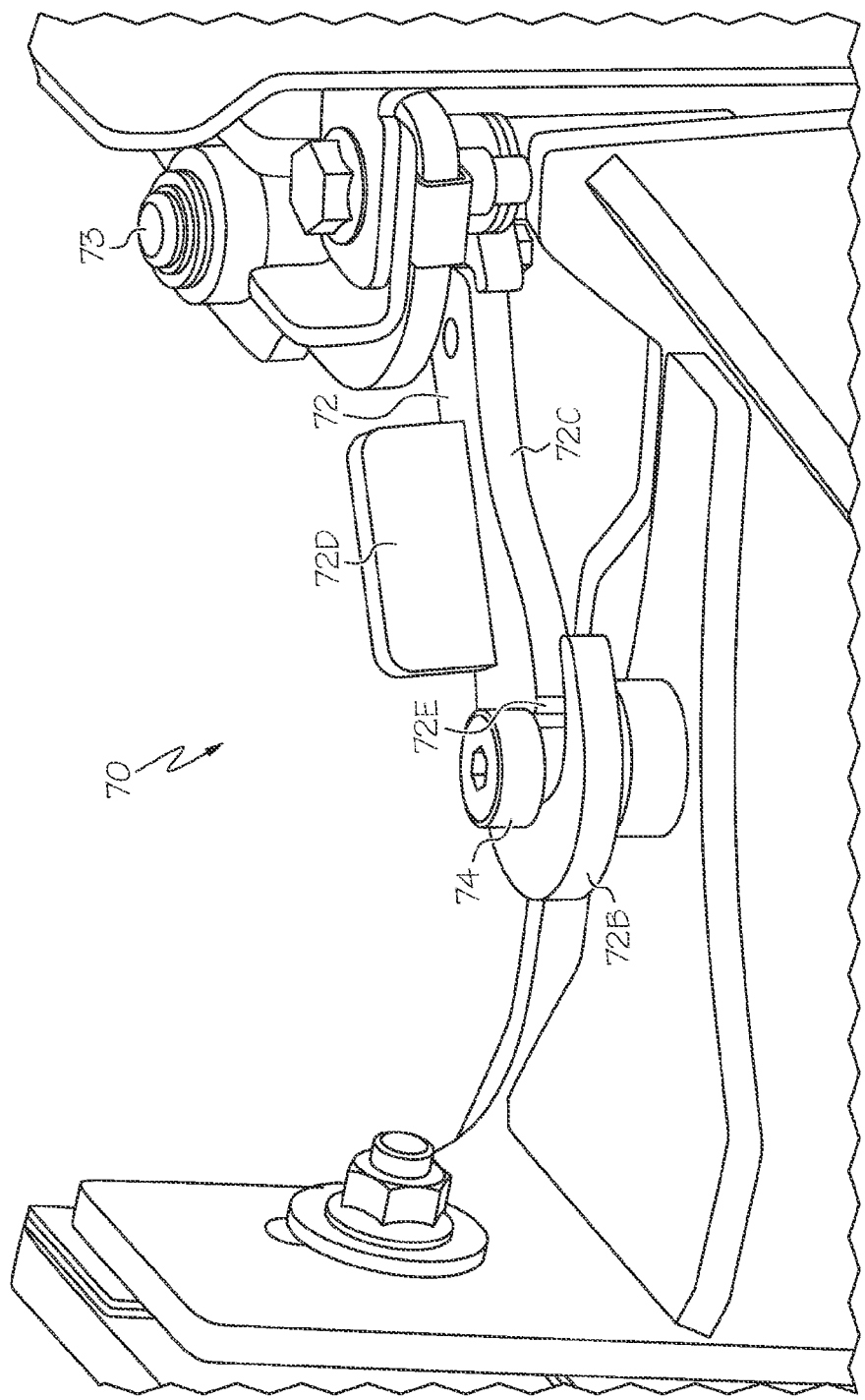

FIG. 2 shows the pivoting door 20 in its fully closed position. FIGS. 3-5 show a progression of movement of the latching arm 72 as the door 20 moves to a fully open position. As the door 20 moves from its closed position to its fully open position, a side edge 72C of the latching arm 72 moves along the latching bolt 74 until the latching bolt 74 is received in the latching arm hook 72B, see FIG. 5. As noted above, the second torsion spring 75 biases the latching arm 72 in a direction toward the latching bolt 74. Once the bolt 74 is received in the hook 72B, the door 20 is in its fully open position as the latching arm 72 prevents further pivoting movement of the door 20 in a direction away from its closed position. To release the latching arm 72 from the bolt 74, an operator engages a release extension 72D on the latching arm 72 so as to pull the arm 72 away from the latching bolt 74, to allow an edge 72E on the arm 72 to move beyond the latching bolt 74 as an operator begins to pivot the door toward its closed position. As the door 20 is moved to its closed position, the latching arm side edge 72C can once again move along the bolt 74.

Figure 6:
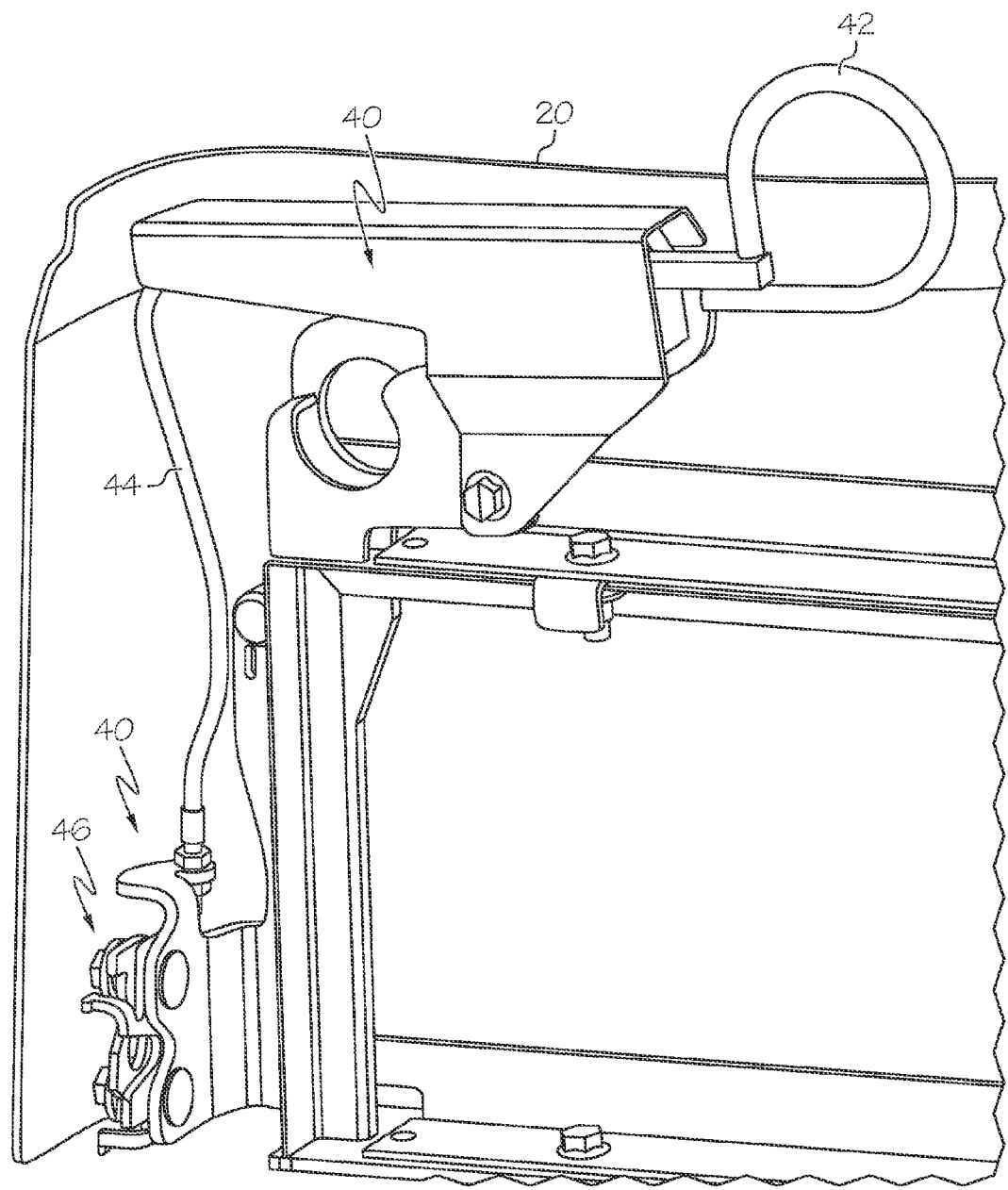
FIG. 6 depicts a releasable locking mechanism associated with a pivoting door in accordance with the principles of the present invention.

FIG. 6 depicts a releasable locking mechanism associated with the pivoting door 20 in accordance with the principles of the present invention. When the door is in the closed position, the locking mechanism 40 helps maintain the door 20 in that position. One of ordinary skill will recognize that a variety of different techniques can be used to secure the door 20 without departing from the scope of the present invention. Thus, FIG. 6 merely illustrates one possible locking mechanism that could be used in accordance with the principles of the present invention. The releasable locking mechanism 40 may include a pull ring 42 coupled to a cable 44, which, in turn, is coupled to a locking latch 46 that releasably engages with a bolt 47, or other structure, on the first fixed wall 10B to lock the door to the first wall 10B.

Figure 7:
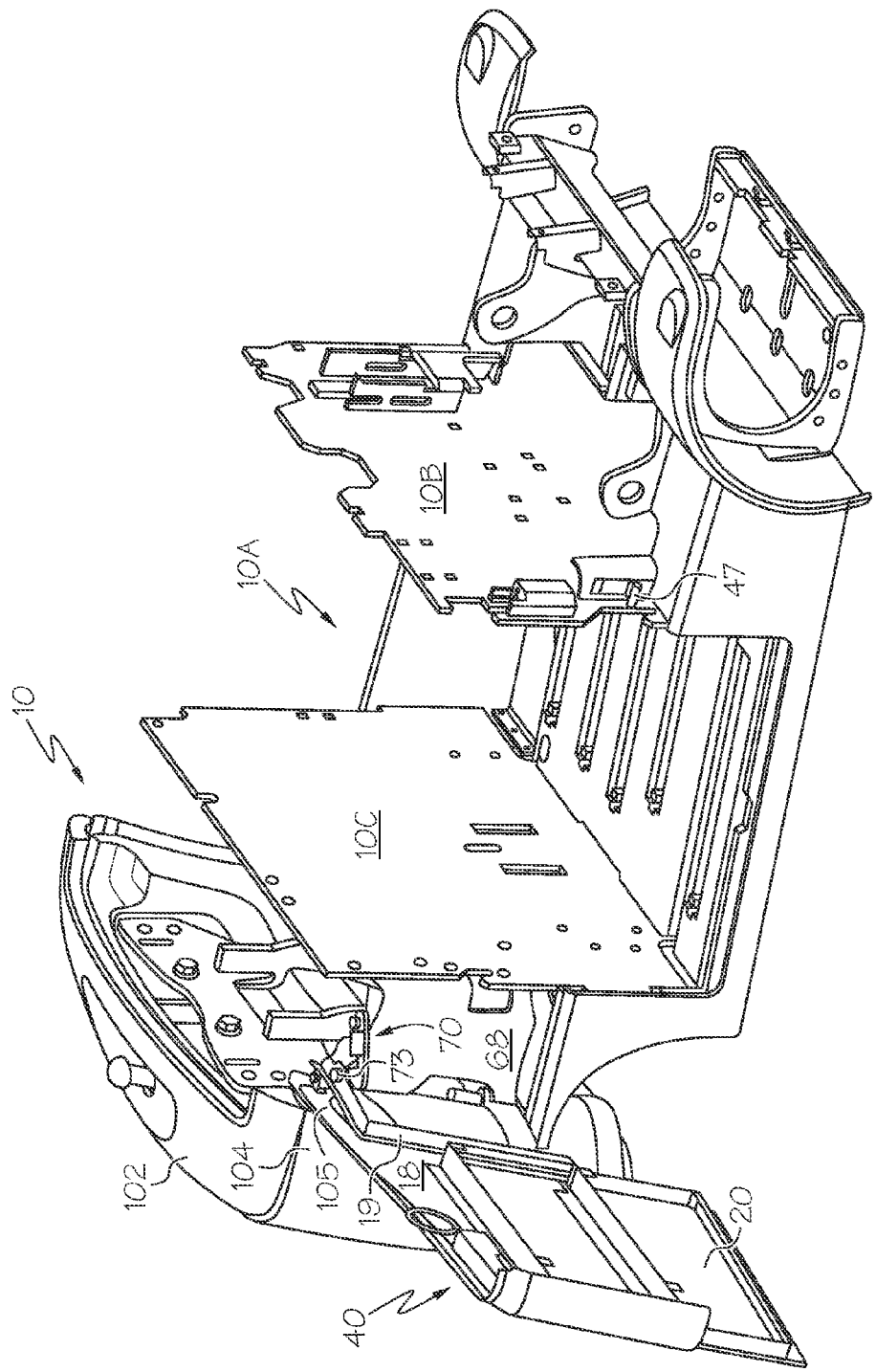
FIG. 7 depicts a pivoting door in a fully-open position in accordance with the principles of the present invention.
Figure 8:
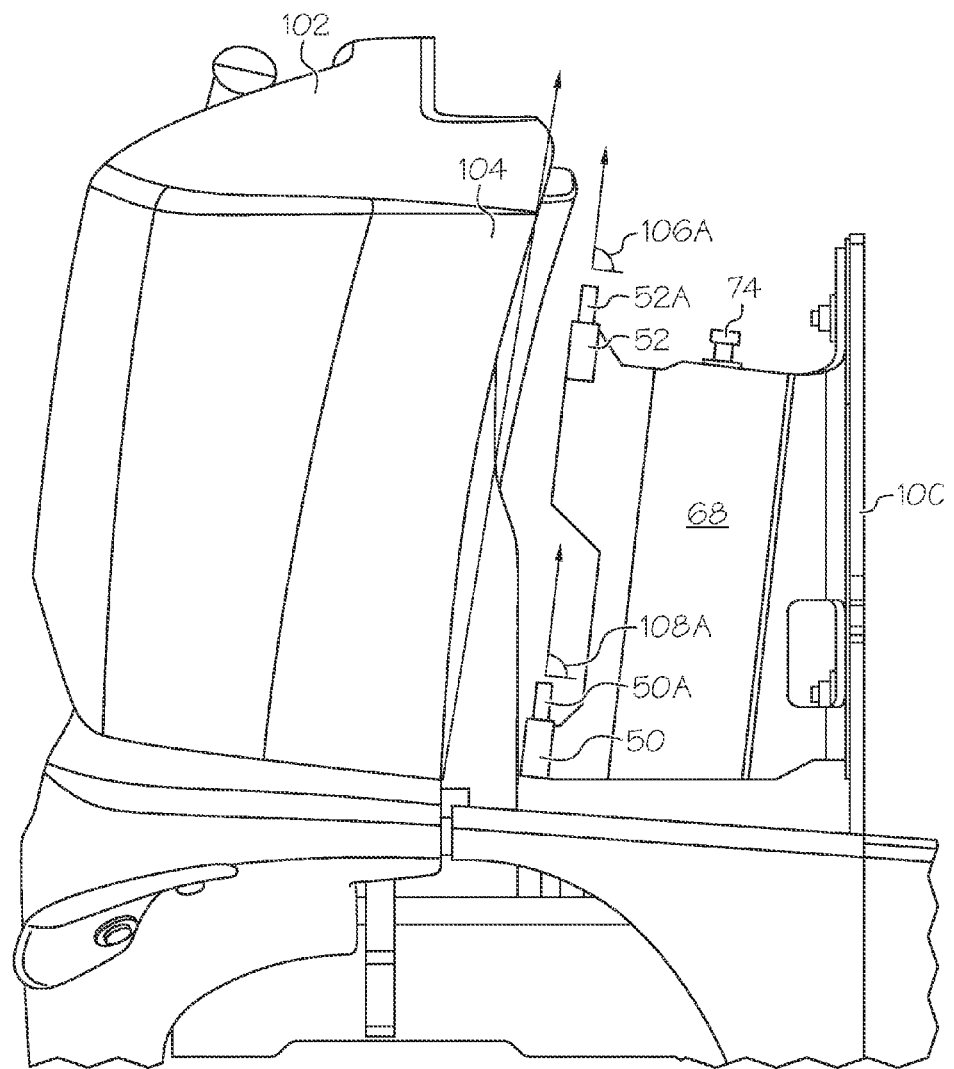
FIG. 8 depicts details about pivoting structure associated with a pivoting door in accordance with the principles of the present invention.

FIG. 7 depicts the pivoting door 20 in its fully-open position in accordance with the principles of the present invention. In FIG. 7, the pivoting door 20 can be seen in its fully open position within the context of being attached to the vehicle frame 10. FIG. 8 depicts details about the pivoting structure associated with a pivoting door 20 in accordance with the principles of the present invention.

As can be seen in FIG. 7 and FIG. 8, the lower and upper pins 50, 52 are not oriented exactly vertically and thereby cause the door 20 to also be tilted relative to vertical when in the fully open position which may result in the door 20 having a tendency to swing towards the closed position. However, as explained with respect to FIGS. 2-5, the latching arm 72 and latching bolt 74 cooperate to maintain the door 20 in the fully open position.

As shown in FIG. 8, the lower pin 50 can be oriented to create, with respect to a horizontal line, an angle 108A that is not 90°. Similarly, the upper pin 52 can be oriented to create, with respect to a horizontal line, an angle 106A that is not 90°. The angles 106A, 108A can be the same and can, for example, be between about 80° and 85° such as, for example, about 83.5°. This orientation of the lower and upper pins 50, 52 allows the pivoting door design to accommodate a curved wall of a counterweight 102 that is adjacent to the door 20. When the door 20 is mounted onto the lower and upper pins 50, 52, the door 20 can swing in a manner that prevents an upper section 105 of the door 20 from striking, or interfering with, a portion 104 of the counterweight 102, see FIG. 7. If the pivoting axis of the door 20 were oriented vertically, then the upper section 105 of the door 20 would likely bind with the counterweight portion 104.

FIG. 7 also helps show that the pivoting door 20 includes a main door panel 18 and a door bracket 19. The main door panel 18 is approximately rectangular in shape and comprises a majority of the door 20. The door bracket 19 is fixed to the main door panel 18 via bolts 19A, see FIG. 2. The door bracket 19 includes in the illustrated embodiment the upper tube 122 adapted to fit over the upper pin receiving portion 52A and the lower tube 121 adapted to fit over the lower pin receiving portion 50A. Also, as shown in FIG. 7, the pin 73 may be coupled to the door bracket 19, which pin 73 defines a pivoting door element to which the first end 72A of the latching arm 72 is pivotably mounted.

FIG. 9 depicts an inside view of the pivoting door of FIG. 7 in a fully-closed position in accordance with the principles of the present invention. The view of FIG. 9 is a view from inside the compartment 10A.

In the above description, the terms "vertical", "lateral", "top", "bottom", "upper", "lower", "below" and "above" are used merely to provide a frame of reference for understanding aspects of the present invention. One of ordinary skill will recognize that these terms are not meant to specify an absolute orientation of each element. Thus, a frame of reference when describing these elements can be changed without departing from the scope of the present invention.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An industrial truck comprising:
    wall structure defining a compartment;
    a pivoting door spanning an opening in the wall structure when in a closed position;
    a pivoting structure coupling the pivoting door to the wall structure allowing the pivoting door to pivot relative to the wall structure; and
    a latching structure comprising:
        a latching bolt coupled to the wall structure;
        a latching arm having a first end and a second end, wherein the arm is pivotably mounted at the first end to an element of the pivoting door; and
        a latch torsion spring associated with the element and engaging the latching arm to bias the latching arm towards the latching bolt when the pivoting door moves in a direction from the closed position towards an open position.

2. The industrial truck of claim 1, wherein the latch torsion spring is biased to move the second end of the latching arm away from the pivoting door when the pivoting door moves in the direction from the closed position towards the open position.

3. The industrial truck of claim 1, wherein the second end of the latching arm comprises a latching hook.

4. The industrial truck of claim 3, wherein movement of the pivoting door, in the direction from the closed position towards the open position, is limited when the latching bolt is received by the latching hook.

5. The industrial truck of claim 4, wherein the latching bolt and the latching hook cooperate, when the latching bolt is received by the latching hook, to maintain the pivoting door in a position defining a fully open position.

6. The industrial truck of claim 5, wherein the latching structure further comprises a release extension coupled to the latching arm, wherein movement of the release extension towards the pivoting door, when the pivoting door is in the fully open position, results in the latching bolt being released from the latching hook.

7. The industrial truck of claim 1, wherein the latch torsion spring comprises:
    a first end engaging the pivoting door, and
    a second end engaging the latching arm.

8. The industrial truck of claim 1, wherein the pivoting door comprises:
    a main panel;
    a door bracket; and
    a pin coupled to the door bracket and defining the pivoting door element.

9. The industrial truck of claim 1, wherein the wall structure comprises:

a first wall;

a second wall; and a wall bracket coupled to the second wall wherein the latching bolt is attached to the wall bracket.

10. The industrial truck of claim 1, wherein the pivoting structure further comprises:

a door torsion spring having a first end and a second end, the first end engaging with the wall structure and the second end engaging with the pivoting door, the door torsion spring biased to oppose movement of the pivoting door transitioning from an open position to the closed position.

11. The industrial truck of claim 1, wherein the compartment contains a battery.

12. An industrial truck comprising:

a wall structure defining a compartment;

a pivoting door spanning an opening in the wall structure when in a closed position; and a pivoting structure coupling the pivoting door to the wall structure allowing the pivoting door to pivot relative to the wall structure, wherein the pivoting structure comprises:

a first torsion spring having a first end and a second end, the first end engaging with the wall structure and the second end engaging with the pivoting door, the first torsion spring biased to oppose movement of the pivoting door transitioning from an open position to the closed position.

13. The industrial truck of claim 12, wherein the first torsion spring is biased to reinforce movement of the pivoting door transitioning from the closed position to the open position.

14. The industrial truck of claim 12, wherein:

the pivoting structure further comprises:

an upper pin and a lower pin coupled to the wall structure, wherein a respective major axis of each of the upper pin and lower pin is tilted a predetermined angle from vertical; and the pivoting door comprises:

a main door panel;

a door bracket;

an upper tube forming part of the door bracket and fitted over the upper pin, and a lower tube forming part of the door bracket and fitted over the lower pin.

15. The industrial truck of claim 14, wherein the first torsion spring is positioned about an outside of the lower tube.

16. The industrial truck of claim 15, wherein the pivoting door further comprises a horizontally oriented pin coupled to an upper end of the lower tube, the second end of the torsion spring engages the horizontally-oriented pin.

17. The industrial truck of claim 16, wherein the wall structure comprises:

a first wall;

a second wall; and a wall bracket coupled to the second wall, wherein the first end of the torsion spring engages a portion of the wall bracket.

18. The industrial truck of claim 17, wherein the first torsion spring is vertically oriented around the lower tube with the first end positioned lower than the second end.

19. The industrial truck of claim 12, comprising:

a releasable locking mechanism locking the pivoting door to the wall structure when in the closed position.

20. The industrial truck of claim 12, wherein the compartment contains a battery.

* * * * *